United States Patent
Chizuwa

(10) Patent No.: US 10,322,639 B2
(45) Date of Patent: *Jun. 18, 2019

(54) CHARGING DEVICE THAT REDUCES AN AMOUNT OF NOISE FLOWING THROUGH A CHARGING SYSTEM IN A VEHICLE

(71) Applicant: Panasonic Intellectual Property Management Co., Ltd., Osaka (JP)

(72) Inventor: Shuhei Chizuwa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,365

(22) Filed: Jul. 31, 2018

(65) Prior Publication Data

US 2018/0334041 A1   Nov. 22, 2018

Related U.S. Application Data

(63) Continuation of application No. 14/897,087, filed as application No. PCT/JP2014/003098 on Jun. 10, 2014, now Pat. No. 10,065,522.

(30) Foreign Application Priority Data

Jun. 11, 2013   (JP) .................................. 2013-122988

(51) Int. Cl.
*H02J 7/00* (2006.01)
*B60L 11/18* (2006.01)
*H02J 7/02* (2016.01)

(52) U.S. Cl.
CPC ......... *B60L 11/185* (2013.01); *B60L 11/1816* (2013.01); *B60L 11/1851* (2013.01);
(Continued)

(58) Field of Classification Search
CPC ...................................................... Y02T 90/14
(Continued)

(56) References Cited

U.S. PATENT DOCUMENTS 5,341,083 A * 8/1994 Klontz ................ B60L 11/1816
                                                           320/109
5,563,491 A * 10/1996 Tseng .................. B60L 11/1816
                                                           194/904
(Continued)

FOREIGN PATENT DOCUMENTS

JP   2000-004542 A    1/2000
JP   2009-240016 A   10/2009
(Continued)

OTHER PUBLICATIONS

International Search Report for Application No. PCT/JP2014/003098 dated Jul. 8, 2014.

*Primary Examiner* — Yalkew Fantu

(74) *Attorney, Agent, or Firm* — Pearne & Gordon LLP

(57) ABSTRACT

Provided are a charging device and a vehicle capable of reducing the amount of noise flowing into a quick-charging facility. The pair of charging lines connecting the quick-charging facility (20) to an onboard battery (30) are referred to as quick-charging lines, and each of these quick-charging lines is provided with a relay (16-1, 16-2). Each relay (16-1, 16-2) is used to switch the current flowing in the respective quick-charging line on and off, the current being switched on during quick-charge and being switched off during normal charging. Each quick-charging line has a Y-capacitor (17) connected thereto closer to a QC port (15) than the respective relay (16-1, 16-2).

19 Claims, 1 Drawing Sheet

(52) U.S. Cl.
CPC .......... *H02J 7/0042* (2013.01); *H02J 7/0052* (2013.01); *H02J 7/022* (2013.01); *B60L 2270/147* (2013.01); *H02J 2007/0059* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
USPC ........................................................ 320/109
See application file for complete search history.

(56) References Cited

U.S. PATENT DOCUMENTS

2010/0241299 A1* 9/2010 Ito ..................... B60L 11/1818
   701/22
2016/0250939 A1* 9/2016 Shin ...................... H04B 3/54
   320/109

FOREIGN PATENT DOCUMENTS

| | | |
|---|---|---|
| JP | 2010-004674 A | 1/2010 |
| JP | 2010-220299 A | 9/2010 |
| JP | 2013-115957 A | 6/2013 |
| KR | 1020160104349 A | 9/2016 |

* cited by examiner

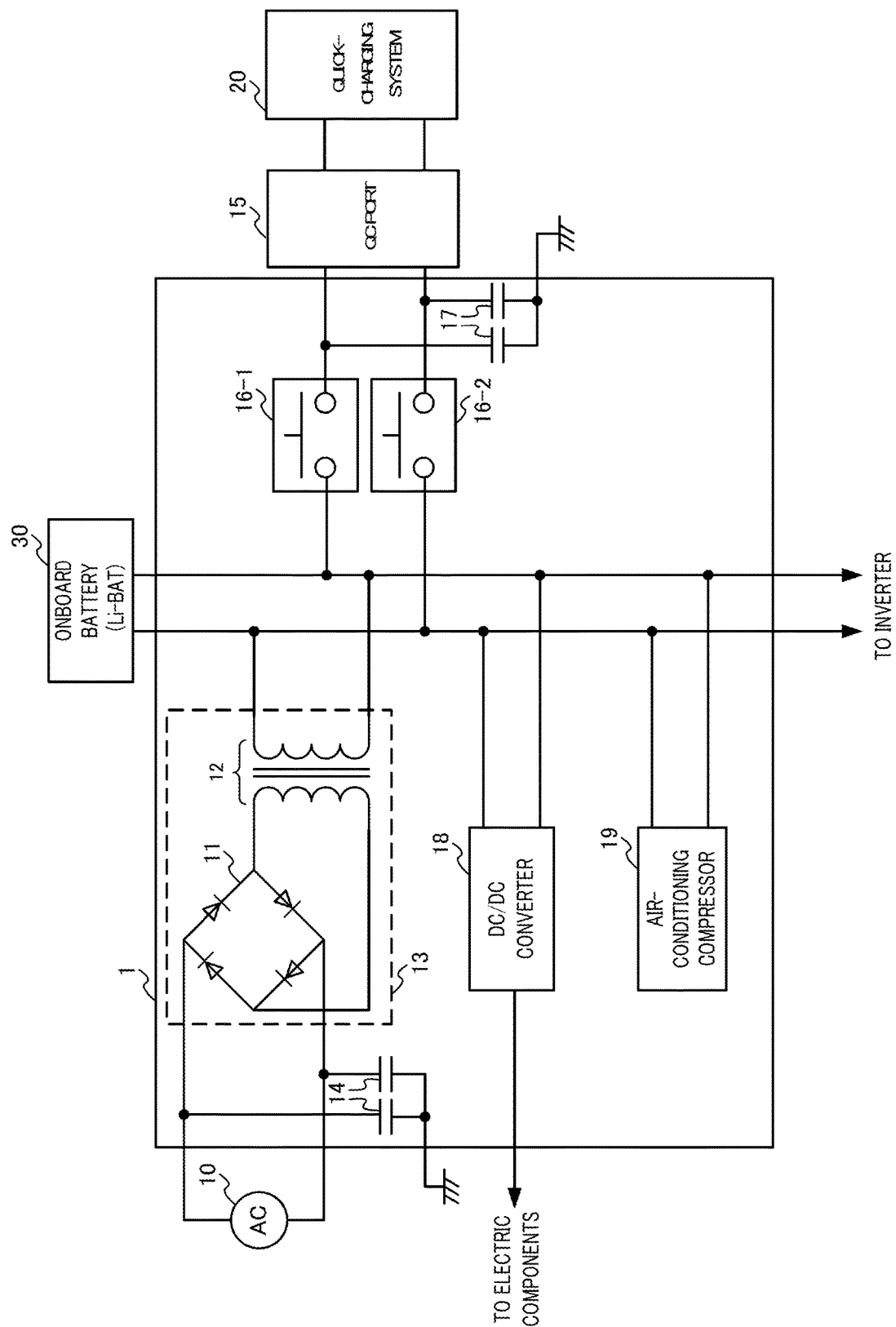

CHARGING DEVICE THAT REDUCES AN AMOUNT OF NOISE FLOWING THROUGH A CHARGING SYSTEM IN A VEHICLE

CROSS REFERENCE TO RELATED APPLICATIONS

This application is a continuation U.S. patent application Ser. No. 14/897,087 filed on Dec. 9, 2015, which claims the benefit of Japanese Patent Application No. 2013-122988 filed Jun. 11, 2013, each of which is incorporated herein by reference in its entirety.

TECHNICAL FIELD

The present invention relates to an onboard charging apparatus and a vehicle that are quickly charged by a quick-charging system provided outside a vehicle.

BACKGROUND ART

Recently, automobiles that run on electricity, such as an Electric Vehicle (EV), and a Plug-in Hybrid Electric Vehicle (PHEV) (hereinafter, referred to simply as "vehicles") have gradually become popular. Such vehicles are equipped with a large-capacity storage battery, and store in the storage battery electric energy charged from the outside and run using the stored electric energy As a method for supplying electric power to a vehicle storage battery from the outside, a method is available in which a charger installed in a vehicle receives the supply of alternating-current (AC) power from a 100V AC power source used in ordinary households and converts the AC power to direct-current (DC) power to charge a storage battery. This method requires a noise-eliminating device for eliminating noise, in order to prevent the inflow of noise into the AC power source. A charging apparatus having such a noise-eliminating device is disclosed, for example, in Patent Literature (hereinafter, referred to as "PTL") 1.

PTL 1 discloses a charging apparatus including a switch in an intermediate grounding conductor that connects, to the ground, a ground side terminal of a Y capacitor that eliminates noise. The switch is configured to connect and disconnect the intermediate grounding conductor, and the charging apparatus disconnects the intermediate grounding conductor by controlling the switch when a security ground terminal is not connected to the ground. Thus, this switching prevents the occurrence of a large potential difference between a vehicle body and the ground even when the intermediate ground conductor is not connected to the ground sufficiently.

Meanwhile, as a method for supplying electric power to a vehicle storage battery from the outside, another method is available in which a quick-charging system provided outside a vehicle directly supplies large DC power to a storage battery.

CITATION LIST

Patent Literature

PTL 1
Japanese Patent Application Laid-Open No. 2009-240016

SUMMARY OF INVENTION

Technical Problem

However, the quick-charging line that connects the quick-charging system to the storage battery is not provided with a noise countermeasure. Therefore, there is a problem in which, when a circuit such as a DC/DC converter that operates using the storage battery as a power source undesirably starts operating during quick charging, noise may occur from such a circuit and flow into the quick-charging system.

An object of the present invention is to provide a charging apparatus and a vehicle each reducing the amount of noise flowing into a quick-charging system.

Solution to Problem

The charging apparatus of the present invention has a configuration including: a quick-charging line having one end being connected to a line between a battery and a component which becomes a noise source when the component operates during quick charging to the battery, and having the other end being connected to an input side of quick charging; and a first noise filter that is disposed on the quick-charging line and eliminates noise.

Advantageous Effects of Invention

According to the present invention, it is possible to reduce the amount of noise flowing into a quick-charging system.

BRIEF DESCRIPTION OF DRAWINGS

FIG. 1 is a diagram illustrating a configuration of a charging apparatus according to an embodiment of the present invention.

DESCRIPTION OF EMBODIMENT

Hereinafter, an embodiment of the present invention will be described in detail with reference to the drawing.

Embodiment

<Configuration of Charging Apparatus>

FIG. 1 is a diagram illustrating a configuration of charging apparatus 1 according to an embodiment of the present invention. Hereinafter, the configuration of charging apparatus 1 will be described with the aid of FIG. 1. FIG. 1 also illustrates, in addition to charging apparatus 1, 100 V AC power source 10 used in ordinary households, quick-charging system 20 that is provided outside a vehicle and supplies large DC power (e.g., 300 V), and onboard battery 30 that is a storage battery such as a lithium-ion battery. Charging apparatus 1 is equipped on vehicles such as an EV having onboard battery 30, and charges onboard battery 30 utilizing power from AC power source 10 or quick-charging system 20.

AC/DC converter 13 including bridge circuit 11, transformer 12, and a switching circuit (not illustrated) or the like converts AC power supplied from AC power source 10 to DC power, and onboard battery 30 is charged.

A pair of charging lines connecting AC power source 10 to bridge circuit 11 is referred to as normal charging lines, and Y capacitors 14 are connected to the normal charging lines, respectively. Y capacitors 14 are grounded to the body ground at a neutral point and reduce noise that flows into AC power source 10 from AC/DC converter 13 to a certain current value or lower and causes the noise to flow to the body ground.

QC port 15 is a connector capable of detachably connecting quick-charging system 20 to charging apparatus 1.

A pair of charging lines each having one end being connected to a line that connects onboard battery 30 to DC/DC converter 18, and air conditioning compressor 19, and/or the like to be described hereinafter, and the other end being connected to QC port 15 is referred to as a quick-charging line, and the respective quick-charging lines are provided with relays 16-1 and 16-2. Relays 16-1 and 16-2 switch on and off the current flowing through the quick-charging line. Relays 16-1 and 16-2 switch the current on during quick charging, and switch the current off during normal charging.

Further, Y capacitors 17 are connected respectively to the quick-charging lines on QC port 15 side (input side of quick charging) with respect to relays 16-1 and 16-2 of the respective quick-charging lines. Y capacitor 17 is connected to the body ground at a neutral point and reduces noise from DC/DC converter 18 and air-conditioning compressor 19 to be described hereinafter to a certain current value or lower and causes the noise to flow to the body ground.

DC/DC converter 18 lowers DC power supplied from onboard battery 30 to about 14 V, for example, and supplies the power to electric components of the vehicle. Further, air-conditioning compressor 19 uses the DC power supplied from onboard battery 30 to compress a refrigerant for air conditioning. It is noted that DC/DC converter 18 and air-conditioning compressor 19 become a noise source that generates noise, when they operate during quick charging.

Onboard battery 30 is charged by AC power source 10 or quick-charging system 20, and supplies the charged power to DC/DC converter 18, air-conditioning compressor 19, and an inverter (not illustrated) or the like.

In this manner, charging apparatus 1 connects Y capacitors 17 to the quick-charging lines. Thus, even when DC/DC converter 18, and air-conditioning compressor 19, and/or the like operate during quick charging, the amount of noise flowing into quick-charging system 20 can be reduced by causing the noise generated from these circuits to flow to the body ground through Y capacitor s.

<Y Capacitors for Quick Charging>

Here, Y capacitors 17 will be described.

When Y capacitors 17 are provided on onboard battery 30 side with respect to relays 16-1 and 16-2, the total electrostatic capacitance of Y capacitors 17 and Y capacitors 14 for normal charging increases, which causes a current flowing through the vehicle body to increase during normal charging, thus undesirably increasing the possibility of an electric shock.

Under such circumstances, the present invention provides Y capacitors 17 on QC port 15 side with respect to relays 16-1 and 16-2 of the quick-charging lines, as described above, to thereby prevent the inflow of noise into Y capacitors 17 during normal charging. Thus, it becomes possible to avoid the increase of the total electrostatic capacitance of the Y capacitors, thereby avoiding the possibility of an electric shock.

It is noted that, since transformer 12 is isolated during quick charging, no noise flows into Y capacitors 14. Further, there is a standard which requires that a leakage current from a Y capacitor should be 3.5 mA or lower (IEC 61851), and thus, the electrostatic capacitance of a Y capacitor needs to be 35.16 nF or lower due to this requirement.

Effects of Embodiment

Thus, according to the present embodiment, connecting Y capacitors 17 to the quick-charging lines that connects quick-charging system 20 to onboard battery 30 makes it possible to reduce the amount of noise flowing into quick-charging system 20 by causing the noise generated from noise sources such as DC/DC converter 18, and air-conditioning compressor 19 and/or the like to flow to the body ground through Y capacitors 17, even when these noise sources operate during quick charging.

Further, according to the present embodiment, disposing Y capacitors 17 on QC port 15 side with respect to relays 16-1 and 16-2 of the quick-charging lines makes it possible to block the noise from flowing into Y capacitors 17 during normal charging, thus avoiding the increase of the total electrostatic capacitance of the Y capacitors, to thereby avoid the possibility of an electric shock.

Note that, the description has been given with the Y capacitors each serving as a capacitor to be connected to the quick-charging line in the present embodiment, but an X capacitor, a coil, a ferrite, or the like may be used in place of the Y capacitor as a countermeasure against noise. Further, the number of Y capacitors to be connected to the quick-charging lines may be one.

In addition, the present embodiment has been described with the assumption that DC/DC converter 18 and air-conditioning compressor 19 which become noise sources that generate noise when they operate during quick charging are also included in charging apparatus 1, but these noise sources need not be included in charging apparatus 1.

The disclosure of Japanese Patent Application No. 2013-122988, filed on Jun. 11, 2013, including the specification, drawing and abstract, is incorporated herein by reference in its entirety.

INDUSTRIAL APPLICABILITY

The charging apparatus and vehicle according to the present invention are applicable to automobiles that run on electricity, such as an EV and a PHEV.

REFERENCE SIGNS LIST

1 Charging apparatus
10 AC power source
11 Bridge circuit
12 Transformer
13 AC/DC converter
14, 17 Y capacitor
15 QC port
16-1, 16-2 Relay
18 DC/DC converter
19 Air-conditioning compressor
20 Quick-charging system
30 Onboard battery

The invention claimed is:

1. A charging apparatus comprising:
a first line for supplying direct-current power supplied from an external direct-current power source to a battery, the first line having one end being electrically connected to a second line electrically connecting the battery and a component which becomes a noise source when the component operates during charging from the external direct-current power source to the battery, and having the other end being electrically connected to the external direct-current power source; and
a first noise filter that is disposed on the first line,
wherein the second line is electrically connected to one end of a third line having the other end being electrically connected to an external alternating-current power source, and the third line is provided with an AC/DC converter and a second noise filter, the second noise filter being disposed on the external alternating-current power source side with respect to the AC/DC converter of the third line.

2. The charging apparatus according to claim 1, wherein the first line is a quick-charging line.

3. The charging apparatus according to claim 1, wherein the third line is a normal charging line.

4. The charging apparatus according to claim 1, wherein the first noise filter is a Y capacitor.

5. The charging apparatus according to claim 4, wherein the second noise filter is a Y capacitor.

6. The charging apparatus according to claim 5, wherein the AC/DC converter comprises a transformer.

7. The charging apparatus according to claim 6, further comprising:
a relay that is disposed on the first line and switches on and off a current flowing through the first line, wherein
the first noise filter is disposed on the external direct-current power source side with respect to the relay,
the first noise filter is connected to the vehicle body ground at a neutral point and reduces noise from the noise source to a certain current value or lower and causes the noise to flow to the vehicle body ground,
the second noise filter is grounded to the vehicle body ground at a neutral point and reduce noise that flows into the external alternating-current power source from the AC/DC converter to a certain current value or lower and causes the noise to flow to the vehicle body ground, and
the relay is switched on during power supply from the external direct-current power source to the battery, and is switched off during power supply from the external alternating-current power source to the battery.

8. The charging apparatus according to claim 7, wherein the noise source comprises a DC/DC converter and an air conditioning compressor.

9. A vehicle comprising:
a first line for supplying direct-current power supplied from a external direct-current power source to a battery, the first line having one end being electrically connected to a second line electrically connecting the battery and a component which becomes a noise source when the component operates during charging form the external direct-current power source to the battery, and having the other end being electrically connected to the external direct-current power source; and
a first noise filter that is disposed on the first line,
wherein the second line is electrically connected to one end of a third line having the other end being electrically connected to an external alternating-current power source, and the third line is provided with an AC/DC converter and a second noise filter, the second noise filter being disposed on the external alternating-current power source side with respect to the AC/DC converter of the third line.

10. The vehicle according to claim 9, wherein the first noise filter is a Y capacitor.

11. The vehicle according to claim 10, wherein the second noise filter is a Y capacitor.

12. The vehicle according to claim 11, wherein the AC/DC converter comprises a transformer.

13. The vehicle according to claim 12, further comprising:
a relay that is disposed on the first line and switches on and off a current flowing through the first line, wherein
the first noise filter is disposed on the external direct-current power source side with respect to the relay,
the first noise filter is connected to the vehicle body ground at a neutral point and reduces noise from the noise source to a certain current value or lower and causes the noise to flow to the vehicle body ground,
the second noise filter is grounded to the vehicle body ground at a neutral point and reduce noise that flows into the external alternating-current power source from the AC/DC converter to a certain current value or lower and causes the noise to flow to the vehicle body ground, and
the relay is switched on during power supply from the external direct-current power source to the battery, and is switched off during power supply from the external alternating-current power source to the battery.

14. The charging apparatus according to claim 1, wherein the first noise filter is an X capacitor.

15. The charging apparatus according to claim 1, wherein the first noise filter is a coil.

16. The charging apparatus according to claim 1, wherein the first noise filter is a ferrite.

17. The vehicle according to claim 9, wherein the first noise filter is an X capacitor.

18. The vehicle according to claim 9, wherein the first noise filter is a coil.

19. The vehicle according to claim 9, wherein the first noise filter is a ferrite.

* * * * *